(12) United States Patent
Zhou

(10) Patent No.: US 12,181,311 B2
(45) Date of Patent: Dec. 31, 2024

(54) CLUTCH ACTUATOR, SENSING SYSTEM AND METHOD FOR SENSING AN ANGULAR POSITION OF A ROTATIONAL COMPONENT

(71) Applicant: Schaeffler Technologies AG & Co. KG, Herzogenaurach (DE)

(72) Inventor: Jie Zhou, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 353 days.

(21) Appl. No.: 17/793,466

(22) PCT Filed: Jan. 12, 2021

(86) PCT No.: PCT/DE2021/100019
§ 371 (c)(1),
(2) Date: Jul. 18, 2022

(87) PCT Pub. No.: WO2021/151418
PCT Pub. Date: Aug. 5, 2021

(65) Prior Publication Data
US 2023/0079776 A1    Mar. 16, 2023

(30) Foreign Application Priority Data
Jan. 29, 2020    (DE) ..................... 10 2020 102 065.1

(51) Int. Cl.
*H02P 21/20*    (2016.01)
*G01D 3/02*    (2006.01)
(Continued)

(52) U.S. Cl.
CPC ............... *G01D 3/02* (2013.01); *G01D 5/145* (2013.01); *G01D 5/2448* (2013.01); *F16D 2025/081* (2013.01); *F16D 2300/18* (2013.01)

(58) Field of Classification Search
CPC ........ G01D 3/02; G01D 5/145; G01D 5/2448; H02K 7/06; H02K 11/215
See application file for complete search history.

(56) References Cited

U.S. PATENT DOCUMENTS

2006/0077083 A1    4/2006    Kiriyama et al.
2015/0211857 A1*   7/2015    Ruf ........................ G01C 19/56
                                                        73/504.12
(Continued)

FOREIGN PATENT DOCUMENTS

CN          1527025 A       9/2004
CN          101398316 A     4/2009
(Continued)

*Primary Examiner* — Muhammad S Islam

(57) ABSTRACT

A first sensor signal and a second sensor signal are provided by a sensor unit to an evaluation unit. The first sensor signal is dependent on the angular position and is associated with a first detection position, and the second sensor signal is associated with a second detection position lying about the rotational axis perpendicular to the first detection position. An angular position of a rotational component is determined by the evaluation unit based on output from an atan2-function that takes the first and second sensor signals as input. A harmonic error is determined by the evaluation unit based on a periodic error signal that is superimposed on each of the sensor signals. An angular error of the angular position is determined by the evaluation unit based on the harmonic error. The angular position is updated by the evaluation unit based on the angular error.

20 Claims, 5 Drawing Sheets

(51) Int. Cl.
*G01D 5/14* (2006.01)
*G01D 5/244* (2006.01)
F16D 25/08 (2006.01)

(56) References Cited

U.S. PATENT DOCUMENTS

| | | | |
|---|---|---|---|
| 2018/0080797 A1* | 3/2018 | Roos | G01D 18/001 |
| 2019/0340875 A1* | 11/2019 | Higgins | G06Q 20/3224 |
| 2020/0007061 A1* | 1/2020 | Frischen | G01L 3/10 |

FOREIGN PATENT DOCUMENTS

| | | |
|---|---|---|
| CN | 106574851 A | 4/2017 |
| CN | 107543564 A | 1/2018 |
| CN | 108627082 A | 10/2018 |
| CN | 110546463 A | 12/2019 |
| DE | 102017115916 A1 | 1/2019 |
| DE | 102017128891 A1 | 6/2019 |
| DE | 102017202217 B4 | 7/2019 |
| DE | 102018004645 B3 | 7/2019 |
| DE | 102018131708 A1 | 6/2020 |
| DE | 102020102064 B3 | 5/2021 |
| WO | 2006132118 A1 | 12/2006 |
| WO | 2018219388 A1 | 12/2018 |
| WO | 2021151416 A1 | 8/2021 |

\* cited by examiner

CLUTCH ACTUATOR, SENSING SYSTEM AND METHOD FOR SENSING AN ANGULAR POSITION OF A ROTATIONAL COMPONENT

CROSS-REFERENCE TO RELATED APPLICATIONS

This application is the U.S. National Phase of PCT Appln. No. PCT/DE2021/100019 filed Jan. 12, 2021, which claims priority to DE 102020102065.1 filed Jan. 29, 2020, the entire disclosures of which are incorporated by reference herein.

TECHNICAL FIELD

The disclosure relates to a method for detecting an angular position of a rotational component. Furthermore, the disclosure relates to a detection system and a clutch actuator.

BACKGROUND

A method for detecting an angular position of a rotational component is described, for example, in WO 2018/219388 A1. A method for detecting an angular position of a rotational component rotatable about a rotational axis is described therein, in which the angular position of the rotational component is picked up by a sensor system arranged radially at a distance from the rotational axis. A magnetic ring arranged fixedly and concentrically on the rotating component causes a magnetic field that changes relative to the sensor system and is detected by the sensor system, wherein a signal picked up by the sensor system is evaluated with regard to the angular position. The signal picked up by the sensor system is evaluated with regard to amplitude information of the magnetic field and a correction parameter is determined from the amplitude information, by means of which an angular error in the angular position picked up from the signal of the sensor system is determined. The angular error is then used to correct the angular position determined from the signal emitted by the sensor system.

SUMMARY

The disclosure provides an exemplary embodiment for detecting an angular position more accurately and more quickly. The influence of harmonic interference on the sensor signal should be sensed and reduced. As a result, a harmonic error in the sensor signal can be reduced quickly, efficiently, and during operation of a sensor unit. The angular position can be determined more accurately, more quickly, and with less calculation effort. The reliability of the sensor signal is increased.

The sensor unit and the rotational component can be arranged in a vehicle. The rotational component and the rotational element may be arranged to be concentrically rotatable. The sensor unit can be designed as an angle sensor.

The sensor element can be a Hall sensor.

The rotational element can be a magnetic ring. The rotational element can be a permanent magnet. The rotational element can be diametrically magnetized.

A first sensor signal can be a cosine signal, and a second sensor signal can be a sinusoidal signal.

A harmonic error affecting the angular position can be assumed as a periodic error signal superimposed on the sensor signal, using the example of the first sensor signal $S_1^*$ having the signal amplitude $A_1$ as follows $$S_1 = S_1^* + S_{f,1} = A_1 \cos(\omega t) \pm A_{f,1} \cdot \cos(n\omega t + \varphi_1) \quad (1)$$

The error signal characterizing $S_{f,1}$ the harmonic error of the first sensor signal $S_1$ has the error amplitude $A_{f,1}$ and the error frequency $n\omega t$ with the error phase $\varphi_1$. The error signal $S_{f,1}$ is superimposed on the actual first sensor signal $S_1^*$.

The rotation of the rotational element triggering the first sensor signal $S_1$ and also the second sensor signal $S_2$ occurs at the rotational frequency $\omega$.

It could be determined that the main part of the overall error signal characterizing the harmonic error is limited to the error frequency $n\omega$, while the remaining signal components of the error signal can be assumed to have less of an impact thereon. The error signal can therefore be assigned an error frequency, which is integrally dependent on the rotational frequency $\omega$ of the sensor signal. For example, it could be found that the harmonic error with the portion associated with the error frequency $n\omega$ is more than 1% and the angular error of the angular position is less than 0.6°, if this portion of the harmonic error can be compensated.

Analogous to the previous example on the first sensor signal according to (1), a harmonic error of the second sensor signal $S_2$ affecting the angular position can be described as follows $$S_s = S_2^* + S_{f,2} = A_2 \cos(\omega t) \pm A_{f,2} \cdot \cos(n\omega t + \varphi_2) \quad (2)$$

The error signal $S_{f,2}$ characterizing the harmonic error of the second sensor signal $S_2$ has the error amplitude $A_{f,2}$ and the error frequency $n\omega$ with the error phase $\varphi_2$.

An adjustment of the respective first and second sensor signal can be performed, for example, by taking into account the respective Fourier coefficient of the error signal according to (1) and (2). The Fourier coefficient can be determined before the sensor unit is put into operation, and stored, for example, in a lookup table that takes it into account for the respective sensor signal. A lookup table for the first sensor signal $S_1$ and a lookup table for the second sensor signal $S_2$ are created for the respective retrieval during operation of the sensor unit.

Alternatively, the Fourier coefficient can also be determined during operation of the sensor unit. In this way, the influences that change the Fourier coefficient, such as the temperature and time-dependent influences, can be taken into account and the accuracy of the Fourier coefficient can be increased. The disadvantage here, however, is the much higher calculation demand compared to the one-time determination of the Fourier coefficient using lookup tables before commissioning.

An exemplary embodiment for determining the Fourier coefficient during operation of the sensor unit is described below. In particular, this presupposes that the respective sensor signal has already been corrected with regard to a possible amplitude error, offset error and/or orthogonal error, so that the respective error has already been eliminated or reduced as far as possible.

The calculation of the parameters of the respective error signal $S_f$, preferably the error amplitude and/or the error phase, can be performed in a parameter determination step that takes place during operation of the sensor unit within the calculation step. The least squares method proves to be the most suitable and is carried out using the example of the first sensor signal $S_1$ by reducing the function K, which is given as follows $$K = \sum_{i=1}^{n} [S_1(x_i) - y_i]^2 \quad (3)$$

with the values calculated at the respective positions $x_i$ for the first sensor signal $S_1$ and the measured values corresponding to these positions $y_i$ of the sensor element.

On the example of the first sensor signal $S_1$ with the sensing position x, (1) can be transformed, with the assumption of a normalized first sensor signal $S_1$ with $A_1=1$, according to $$S_1(x) = \cos(x) + A_{f,1} \cdot [\cos(nx) \cdot \cos(\varphi_1) - \sin(nx) \cdot \sin(\varphi_1)] \quad (4)$$

$$= \cos(x) + c_2 \cdot \cos(nx) + c_3 \cdot \sin(nx)$$

$$= \sum_{j=1}^{3} c_j \phi_j(x)$$

which gives $$c_1 = 1 \quad (5)$$

$$c_2 = A_{f,1} \cdot \cos(\varphi_1)$$

$$c_3 = A_{f,1} \cdot \sin(\varphi_1)$$

By knowing the parameters $c_2$ and $c_3$, the parameters describing the error signal can be calculated.

The default according to (3) can be established through (4) by the following gradient equations $$\frac{\delta K}{\delta c_j} = 0 \quad (6)$$

The solution of (6) can be found as follows, assuming a linear combination of the parameters $c_j$ $$c = (\phi^T \phi)^{-1} \phi^T y \quad (7)$$

with $$\phi = \phi_j(x_i)$$

$$y = (y_1, \ldots, y_n)$$

$$c = (1, c_2, c_3) \quad (8)$$

The calculation of $\phi$ can be done via a QR decomposition.

The function matrix $\phi$ can be calculated using a gradient-based method, for example by the method of steepest descent, by the following iterative step $$f(\theta^{(k+1)}) = f(\theta^{(k)}) + \nabla f(\theta^{(k)})^T \cdot \gamma^{(k)} \cdot \nabla f(\theta^{(k)}) \quad (9)$$

with the step length $\gamma$ and the step index k and $$\theta^{(k)} = (c_2^{(k)}, c_3^{(k)}) \quad (10)$$

The minimum can thus be calculated quickly via an optimization task, for example using a cost function.

By means of the calculated parameters $c_2$ and $c_3$, the error signal $S_{f,1}$ and analogously, for the second sensor signal, by means of the corresponding parameters, the error signal $S_{f,2}$ can be calculated and the respective sensor signal according to (1) and (2) can be corrected.

A further possibility of compensating for the influence of the respective error signal is described below, which requires a further reduced calculation effort.

The angular position $\alpha^*$ calculated after the evaluation step by applying the atan2 function is adjusted for an angular error $\epsilon$ in a correction step. The angular error $\epsilon$ is calculated from the parameters of the respective error signal sensed in a parameter determination step in an angular error calculation step within a calculation step. The correction step then gives the calculated angular position $\alpha$. An angular error calculation step can be between the parameter determination step and the correction step.

In the angular error calculation step, the maximum angular error $\hat{\epsilon}$ is calculated as follows $$\hat{\epsilon} = \arcsin\left(\frac{A_f}{A}\right) \quad (11)$$

with the error amplitude $A_f$ calculated on the example of the first sensor signal $S_1$ via (10) and (5) as well as the signal amplitude A of the sensor signal.

If the error amplitudes $A_{f,1}$ and $A_{f,2}$ of the first and second sensor signals $S_1$, $S_2$ are different, they can be considered averaged as follows.

$$\hat{\epsilon} = \arcsin\left(\frac{A_{f,1} + A_{f,2}}{2 \cdot A}\right) \quad (12)$$

The angular error $\epsilon$ can be calculated with the angular error frequency $k\omega$ and the error phase $\varphi$ in parallel with an evaluation step in the angular error calculation step, or also in the correction step, on the one hand by a first calculation method as follows $$\epsilon(\omega t) = \arcsin\left(\frac{A_{f,1} + A_{f,2}}{2 \cdot A}\right) \cdot \sin[(k+1) \cdot \omega t + \varphi] \quad (13)$$

if the error signal changes concurrently with the sensor signal, or alternatively via a second calculation method as follows $$\epsilon(\omega t) = \arcsin\left(\frac{A_{f,1} + A_{f,2}}{2 \cdot A}\right) \cdot \sin[(k-1) \cdot \omega t + \varphi] \quad (14)$$

if the error signal changes oppositely with the sensor signal.

The error phase can be calculated using the following relationship $$\varphi = \mathrm{atan2}\left(\frac{c_{3,1} + c_{3,2}}{c_{2,1} + c_{2,2}}\right) \quad (15)$$

with the parameters $c_{2,1}$, $c_{3,1}$ specified according to (5) for the first sensor signal $S_1$ and the corresponding parameters $c_{2,2}$, $c_{3,2}$ for the second sensor signal $S_2$.

Furthermore, a detection system for detecting an angular position of a rotational component is achieved by a method having at least one of the features indicated above. The detection system comprises an evaluation unit and a sensor unit, which has a fixed sensor element and a rotational element rotatable relative thereto and jointly with the rotational component.

Furthermore, a clutch actuator for clutch actuation, having such a detection system is provided. The clutch actuator can actuate a clutch designed as an e-clutch in a vehicle. The clutch actuator can be a modular clutch actuator, or MCA for short. This can comprise a rotor and a spindle. The rotor can perform a rotational movement, which is converted into a linear movement of the spindle via a planetary roller screw drive, abbreviated PWG. The linear movement of the spindle can actuate the clutch.

Further advantages and advantageous embodiments of the disclosure result from the description of the figures and the drawings.

BRIEF DESCRIPTION OF THE DRAWINGS

The disclosure is described in detail below with reference to the drawings. In the figures.

DETAILED DESCRIPTION

Figure 1:
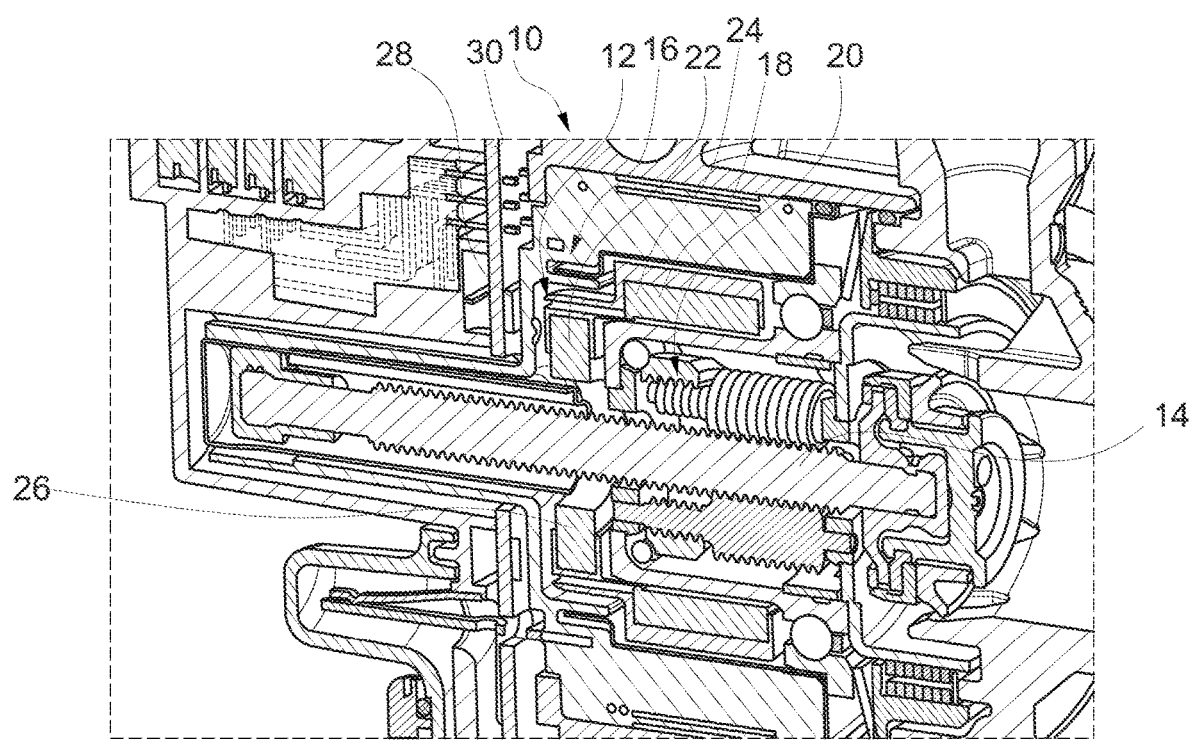
FIG. 1: shows a spatial cross-section through a clutch actuator with a sensor unit according to an exemplary embodiment of the disclosure.

FIG. 1 shows a spatial cross-section through a clutch actuator 10 having a sensor unit 12 according to an exemplary embodiment of the disclosure. The clutch actuator 10 is a modular clutch actuator, a so-called MCA, comprising a spindle 14 and an electric motor 16 having a rotatable rotor 18. The spindle 14 performs a linear movement for clutch actuation and is moved by a rotational movement of the electromechanically driven rotor 18 via a planetary roller screw drive 20, abbreviated PWG.

The sensor unit 12 is arranged to detect an angular position of the rotor 18 and has a rotational element 22, which is embodied as a magnetic ring 26 that is non-rotatably connected to a rotational component 24 embodied as the rotor 18. The magnetic ring 26 is in particular a permanent magnet and diametrically magnetized. The sensor unit 12 also has a sensor element 28, which is embodied as a magnetic sensor, in particular as a Hall sensor. The sensor element 28 is mounted on a circuit board 30 axially spaced from the rotational element 22 and enables a magnetic field emanating from the rotational element 22 to be detected.

The effect of the magnetic field emanating from the rotational element 22 on the sensor element 28 makes it possible to detect the angular position of the rotational component 24, i.e., the rotor 18, since the diametric magnetization of magnetic ring 26 changes the magnetic field depending on the angular position of the rotor 18.

Figure 2:
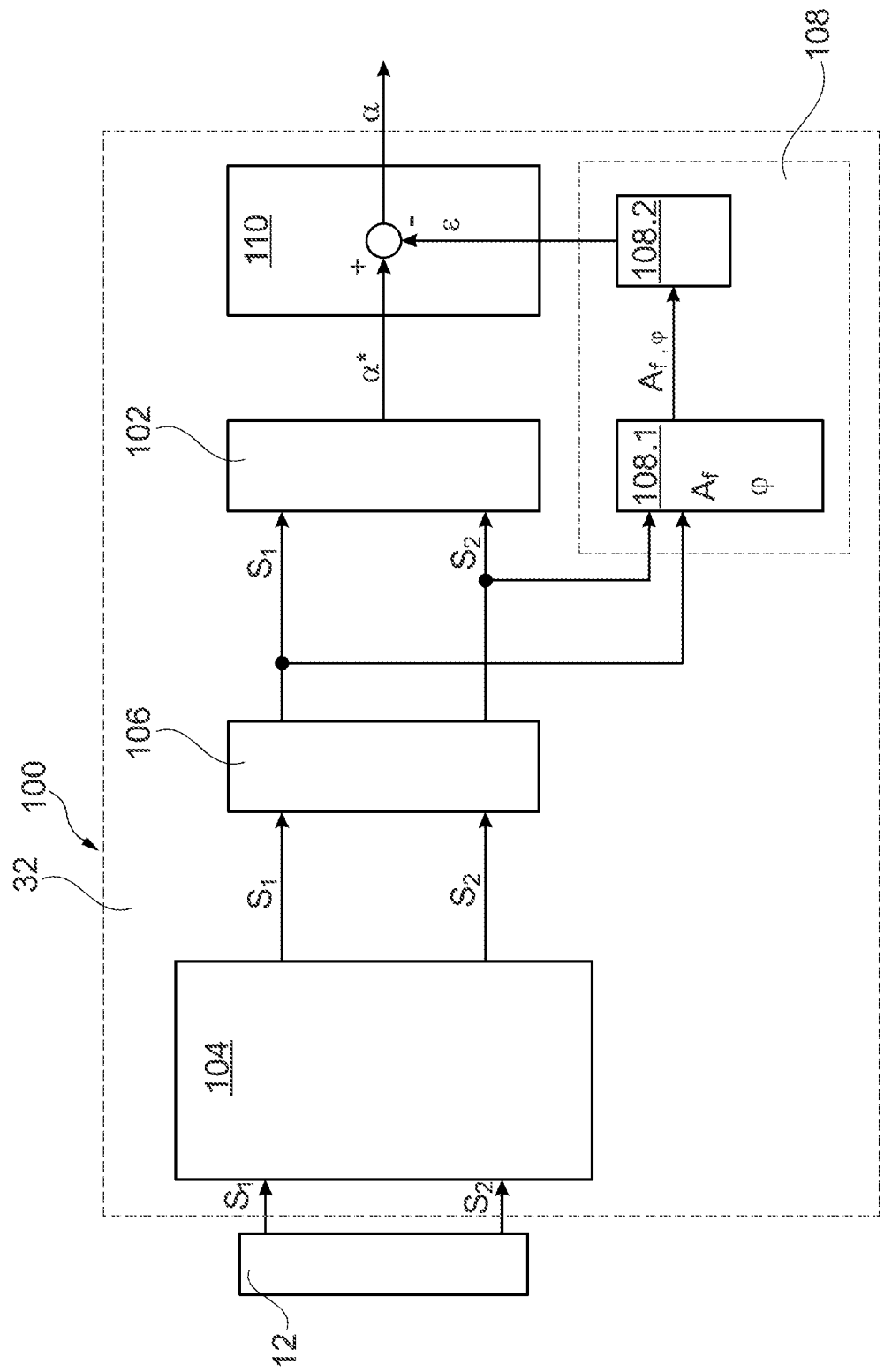
FIG. 2: shows a flow chart of a method for the sensing of an angular position according to an exemplary embodiment of the disclosure.

FIG. 2 shows a flow chart of a method 100 for sensing an angular position α according to an exemplary embodiment of the disclosure. The sensor unit 12 outputs to an evaluation unit 32 a first sensor signal $S_1$ dependent upon the angular position α and assigned to a first sensing position, and a second sensor signal $S_2$ assigned to a second sensing position lying perpendicularly to the first sensing position about the rotational axis.

The evaluation unit 32 calculates the angular position α based on the first and second sensor signals $S_1$, $S_2$ via an atan2 function in an evaluation step 102. The respective first and second sensor signals $S_1$, $S_2$ are periodic signals superimposed with a possible harmonic error. In particular, the first sensor signal $S_1$ is a cosine signal and the second sensor signal $S_2$ is a sinusoidal signal.

A harmonic error of the first sensor signal $S_1$ affecting the angular position α can be described by means of (1). Analogously, a harmonic error of the second sensor signal $S_2$ affecting the angular position α can be described by means of (2).

First, the first and second sensor signal $S_1$, $S_2$ are amplified in the evaluation unit 32 in a processing step 104 and sensed via an A/D converter. The first and second sensor signals $S_1$, $S_2$ processed in this way are then normalized in a preparation step 106, i.e., a possible amplitude error and offset error in the first and second sensor signal $S_1$, $S_2$ is compensated for or reduced as much as possible. Furthermore, a possible orthogonal error is preferably already eliminated or reduced as far as possible.

The first and second sensor signals $S_1$, $S_2$ prepared in this way are then transferred to the evaluation step 102, which calculates the angular position α therefrom. The first and second sensor signals $S_1$, $S_2$ are transferred to a calculation step 108, which runs in parallel to the evaluation step 102. This can increase the calculation speed.

In the calculation step 108, an angular error ϵ characterizing the harmonic error is calculated based on the first and second sensor signals $S_1$, $S_2$, and is then output in a correction step 110 following the evaluation step 108. In the correction step 110, the angular position α* calculated by the evaluation step 102 is adjusted for the angular error ϵ and output as the angular position α.

Figure 6:
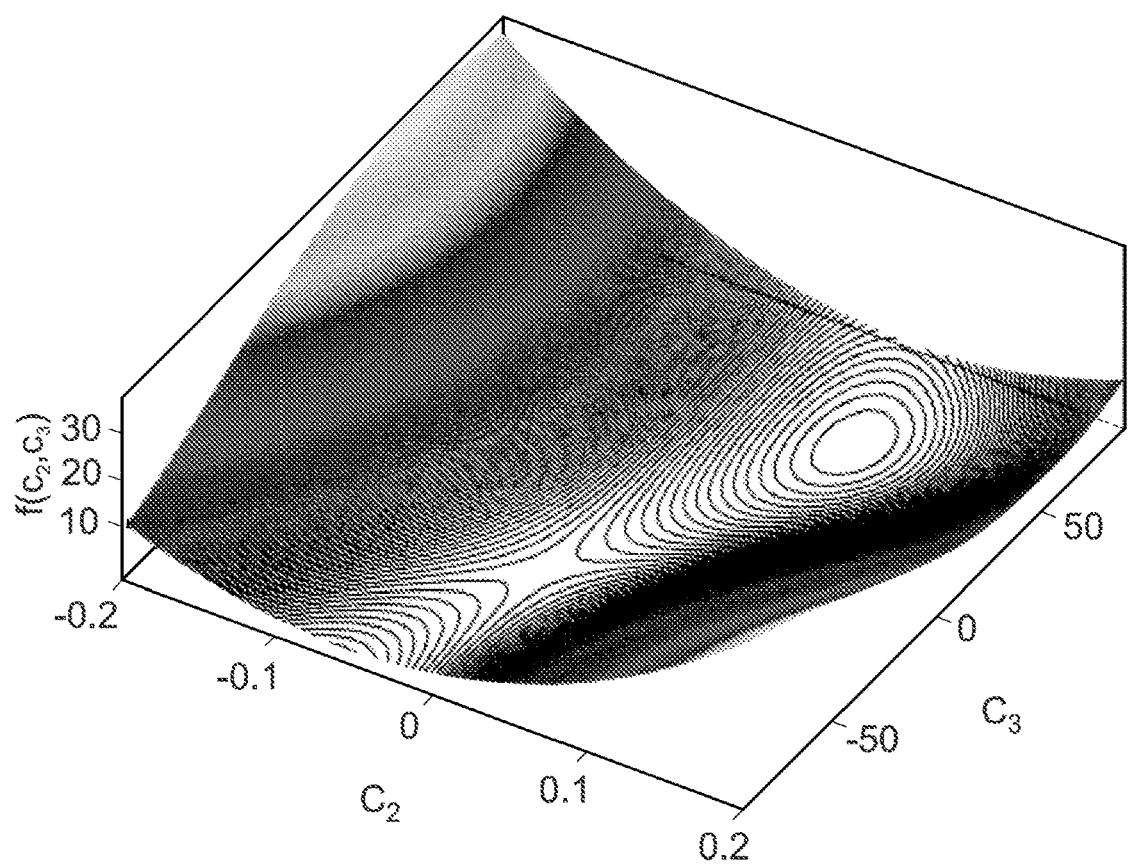
FIG. 6: shows a cost function of a harmonic optimization task to determine the error signal parameters.

The calculation of the angular error ϵ requires that the parameters of the error amplitude $A_f$ and error phase φ that describe the error signal are determined. For this purpose, the calculation step 108 comprises a parameter determination step 108.1, with which the error amplitude $A_f$ and the error phase φ of the respective error signal are calculated. This calculation may be carried out using the least squares method using the relationship (7) in conjunction with a gradient-based method according to (10), which is realized by means of a cost function of the optimization task illustrated in FIG. 6. The parameters defined in this way can then be translated back according to (5), and output in a subsequent angular error calculation step 108.2 assigned to the calculation step 108.

The angular error calculation step 108.2 determines the angular error ϵ depending on the parameters and during the operation of the sensor unit 12 by case-dependent application of the first calculation method according to (13) or the second calculation method according to (14), and transfers this to the correction step 110. The correction step 110 adjusts the angular position α* output for this calculated angular error ϵ through the evaluation step 102 by using the atan2 function. The calculated angular position α is then output by the evaluation unit 32.

Figure 3:
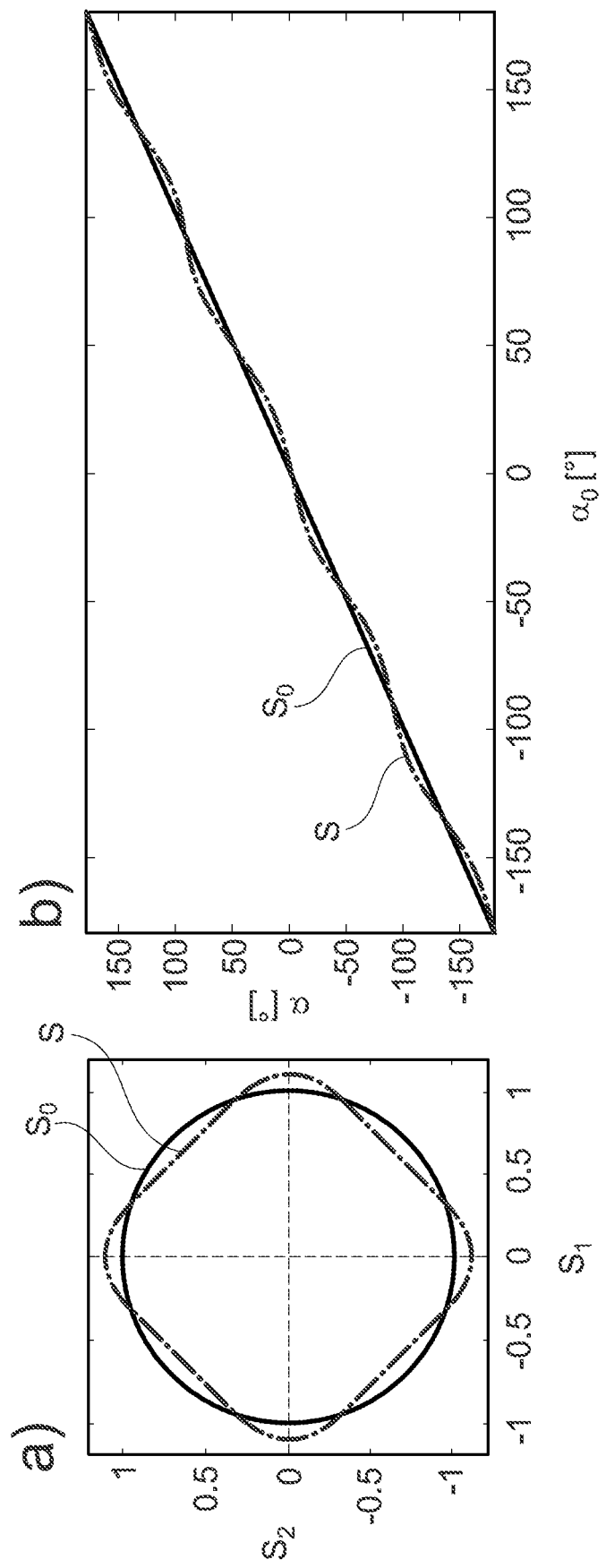
FIG. 3: shows a comparison between a sensor signal with and without harmonic error.

FIG. 3 shows a comparison between a sensor signal with and without a harmonic error. FIG. 3a) shows a curve graph of an ideal sensor signal $S_0$ and a sensor signal S superimposed by an error signal corresponding to a harmonic error. The values on the x-axis represent the first sensor signal $S_1$ associated with the sensor signal S and the values on the y-axis represent the second sensor signal $S_2$ associated with the sensor signal S.

The harmonic error acts as a deviation of the sensor signal S starting from a circular shape and causes the deviations from the actual angular position $\alpha_0$ of the determined angular position $\alpha$ shown in FIG. 3b).

Figure 4:
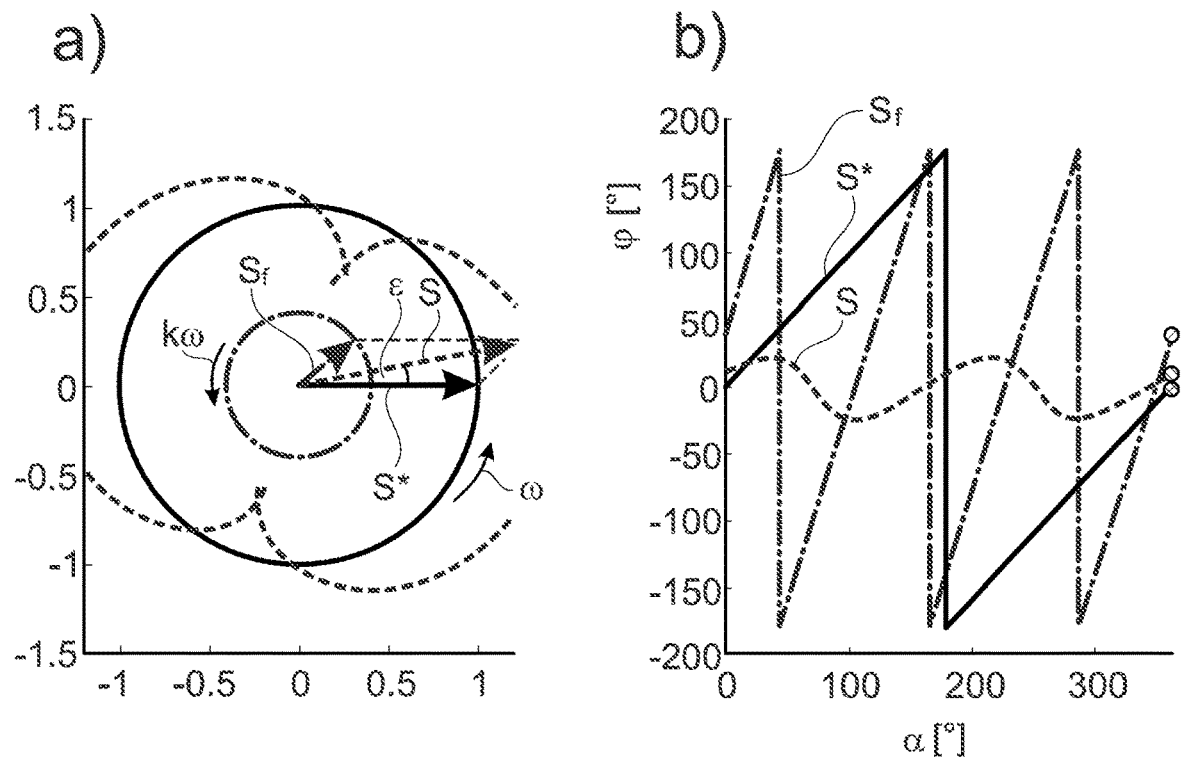
FIG. 4: shows a curve graph and phase progression of a sensor signal influenced by a concurrent error signal.

FIG. 4 shows a curve graph and phase progression of a sensor signal influenced by a concurrent error signal. The concurrent error signal can be taken into account by means of the relationship (13). The error signal $S_f$ changes in the process concurrently with the sensor signal S*, and the indicators shown in FIG. 4a) thus rotate counterclockwise in a concurrent manner. The error signal $S_f$ changes with the angular error frequency $k\omega$, and the sensor signal S* with the rotational frequency $\omega t$. The sensor signal having the harmonic error S has the angular error $\epsilon$ with respect to the sensor signal S*.

FIG. 4b) shows the phase progression of the respective signals over the angular position $\alpha$.

Figure 5:
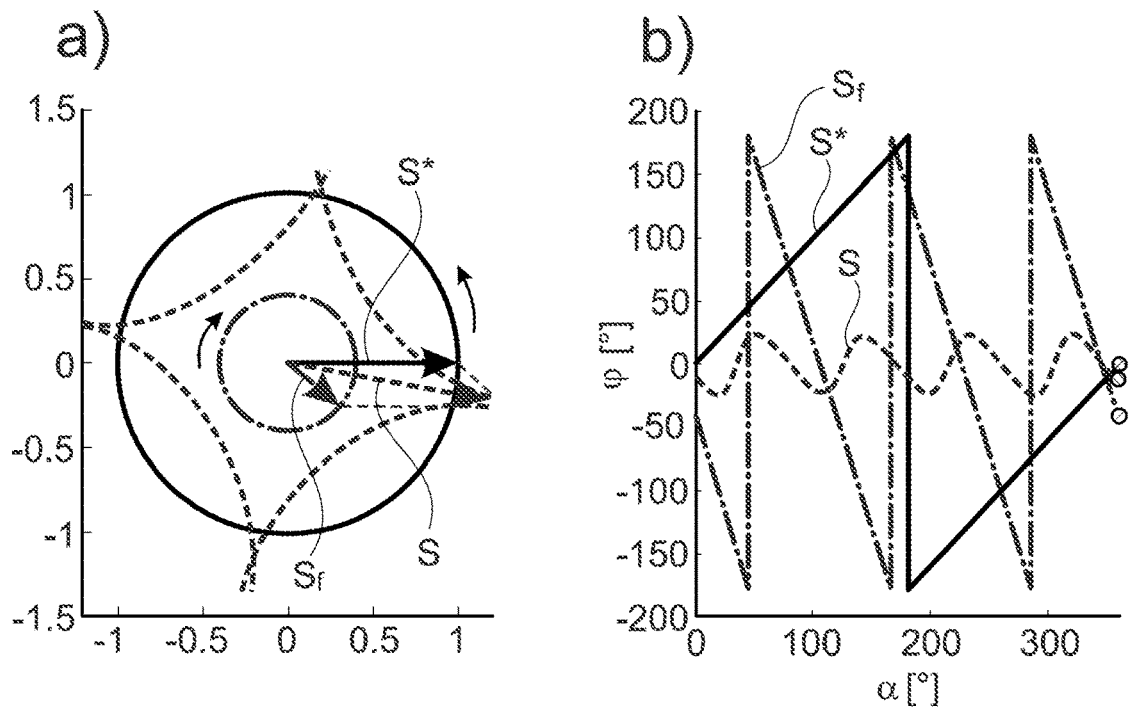
FIG. 5: shows a curve graph and phase progression of a sensor signal influenced by an opposing error signal.

FIG. 5 shows the respective illustrations corresponding to FIG. 4, but here with the difference that the error signal $S_f$ changes oppositely to the sensor signal S* and the indicators shown in FIG. 5a) thus rotate oppositely.

Figure 7:
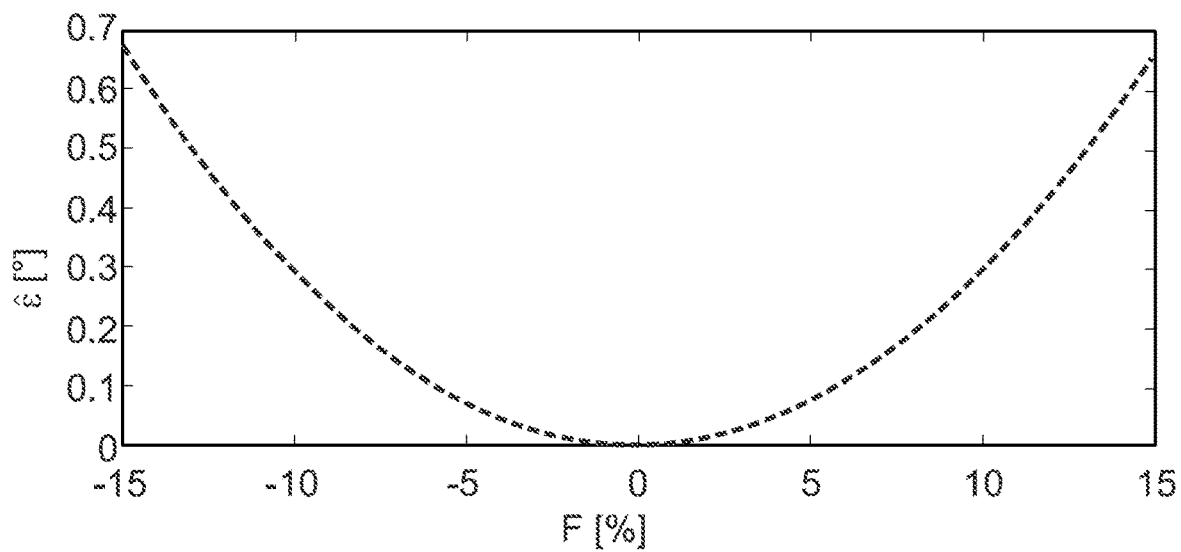
FIG. 7: shows an angular error profile depending on the harmonic error when using the method according to an exemplary embodiment of the disclosure.

In FIG. 7, an angular error profile is shown depending on the harmonic error when using the method according to an exemplary embodiment of the disclosure. The maximum angular error $\hat{\epsilon}$ is proportional to the harmonic error F and with a very large harmonic error F of 15%, the maximum angular error $\hat{\epsilon}$ is still less than 0.7°. As a result, the angular position $\alpha$ is determined efficiently, accurately and quickly, and also during operation of the sensor unit 12, with the smallest possible angular error $\epsilon$.

LIST OF REFERENCE SYMBOLS

10 Clutch actuator
12 Sensor unit
14 Spindle
16 Electric motor
18 Rotor
20 Planetary roller screw drive
22 Rotational element
24 Rotational component
26 Magnetic ring
28 Sensor element
30 Circuit board
32 Evaluation unit
100 Method
102 Evaluation step
104 Processing step
106 Preparation step
108 Calculation step
108.1 Parameter determination step
108.2 Angular error calculation step
110 Correction step
$\alpha$ Angular position
A Signal amplitude
$A_1$ Signal amplitude
$A_2$ Signal amplitude
$A_f$ Error amplitude
$A_{f,1}$ Error amplitude
$A_{f,2}$ Error amplitude
$c_2$ Parameter
$c_3$ Parameter
$\epsilon$ Angular error
$\hat{\epsilon}$ Maximum angular error
F Harmonic error
$\varphi$ Error phase
$\varphi_1$ Error phase
$\varphi_2$ Error phase
$\omega$ Rotational frequency
$n\omega$ Error frequency
S Sensor signal
S* Sensor signal
$S_1$ First sensor signal
$S_2$ Second sensor signal
$S_f$ Error signal
$S_{f,1}$ Error signal
$S_{f,2}$ Error signal

The invention claimed is:

1. A method for detecting an angular position of a rotational component rotatable about a rotational axis, the method comprising:
   providing, via a sensor unit, a first sensor signal and a second sensor signal to an evaluation unit, wherein the first sensor signal is dependent on the angular position and is associated with a first detection position, and the second sensor signal is associated with a second detection position lying about the rotational axis perpendicular to the first detection position;
   determining via the evaluation unit, the angular position based on output from an atan2-function that takes the first and second sensor signals as input;
   determining, via the evaluation unit, a harmonic error based on a periodic error signal that is superimposed on each of the sensor signals;
   determining, via the evaluation unit, an angular error of the angular position based on the harmonic error; and
   updating, via the evaluation unit, the angular position based on the angular error.

2. The method according to claim 1, further comprising, determining, via the evaluation unit, an error amplitude and an error phase of each periodic error signal via a gradient-based method.

3. The method according to claim 1, further comprising determining via the evaluation unit, an error amplitude and an error phase of each periodic error signal via a least squares method.

4. The method according to claim 3, further comprising determining, via the evaluation unit, the error amplitude and the error phase additionally via a gradient-based method.

5. The method according to any one of the preceding claim 1, further comprising determining, via the evaluation unit, the angular error based on an error amplitude of each periodic error signal and a signal amplitude of each sensor signal.

6. The method according to claim 5, wherein the angular error is determined via a first calculation method when the respective periodic error signal changes concurrently with the corresponding sensor signal and via a second calculation method when the respective periodic error signal changes oppositely to the corresponding sensor signal.

7. The method according to claim 1, further comprising:
   assigning, via the evaluation unit, an error frequency to each periodic error signal, wherein the error frequency is integrally dependent on a rotational frequency of the corresponding sensor signal; and
   determining the angular error based on the error frequency.

8. The method according to claim 1, further comprising, prior to determining at least one of the angular position or the angular error, correcting, via the evaluation unit, at least one of the sensor signal based on at least one of an amplitude error, a phase error, or an orthogonal error.

9. A detection system for detecting an angular position of a rotational component rotatable about a rotational axis, the detection system comprising:
an evaluation unit, and
a sensor unit configured to provide a first sensor signal and a second sensor signal to the evaluation unit, wherein the first sensor signal is dependent on the angular position and is associated with a first detection position, and the second sensor signal is associated with a second detection position lying about the rotational axis perpendicular to the first detection position;
wherein the evaluation unit is configured to:
determine the angular position based on output from an atan2-function that takes the first and second sensor signals as input;
determine a harmonic error based on a periodic error signal that is superimposed on each of the sensor signals;
determine an angular error of the angular position based on the harmonic error; and
update the angular position based on the angular error.

10. A clutch actuator for clutch actuation, comprising a detection system according to claim 9.

11. The method according to claim 1, wherein the sensor unit includes:
a fixed sensor element; and
a rotational element that can rotate relative to the sensor element and jointly with the rotational component.

12. The method according to claim 11, wherein the sensor element is axially spaced from the rotational element.

13. The detection system according to claim 9, wherein the evaluation unit is further configured to determine an error amplitude and an error phase of each periodic error signal via a gradient-based method.

14. The detection system according to claim 9, wherein the evaluation unit is further configured to determine an error amplitude and an error phase of each periodic error signal via a least squares method.

15. The detection system according to claim 14, wherein the evaluation unit is further configured to determine the error amplitude and the error phase additionally via a gradient-based method.

16. The detection system according to claim 9, wherein the evaluation unit is further configured to determine the angular error based on an error amplitude of each periodic error signal and a signal amplitude of each sensor signal.

17. The detection system according to claim 16, wherein the angular error is determined via a first calculation method when the respective periodic error signal changes concurrently with the corresponding sensor signal and via a second calculation method when the respective periodic error signal changes oppositely to the corresponding sensor signal.

18. The detection system according to claim 9, wherein the evaluation unit is further configured to:
assign an error frequency to each periodic error signal, wherein the error frequency is integrally dependent on a rotational frequency of the corresponding sensor signal; and
determine the angular error based on the error frequency.

19. The detection system according to claim 9, wherein the evaluation unit is further configured to, prior to determining at least one of the angular position or the angular error, correct at least one of the sensor signals based on at least one of an amplitude error, a phase error, or an orthogonal error.

20. The detection system according to claim 9, wherein the sensor unit includes:
a fixed sensor element; and
a rotational element that can rotate relative to the sensor element and jointly with the rotational component;
wherein the sensor element is axially spaced from the rotational element.

\* \* \* \* \*